(12) United States Patent
Hessenkemper

(10) Patent No.: US 9,193,633 B2
(45) Date of Patent: Nov. 24, 2015

(54) POROUS FIREPROOF MATERIAL SUITABLE FOR GLASS PRODUCTION, METHOD FOR THE PRODUCTION THEREOF, AND USES

(75) Inventor: Heiko Hessenkemper, Grossschirma (DE)

(73) Assignee: Tu Bergakademie Freiberg, Freiberg (DE)

( * ) Notice: Subject to any disclaimer, the term of this patent is extended or adjusted under 35 U.S.C. 154(b) by 307 days.

(21) Appl. No.: 12/738,244

(22) PCT Filed: Oct. 9, 2008

(86) PCT No.: PCT/EP2008/063571
§ 371 (c)(1),
(2), (4) Date: Apr. 15, 2010

(87) PCT Pub. No.: WO2009/050108
PCT Pub. Date: Apr. 23, 2009

(65) Prior Publication Data
US 2010/0242542 A1  Sep. 30, 2010

(30) Foreign Application Priority Data
Oct. 17, 2007 (DE) .................... 10 2007 049 634

(51) Int. Cl.
*C03B 3/00* (2006.01)
*C04B 41/00* (2006.01)
*C03B 5/43* (2006.01)
*C04B 41/45* (2006.01)
*C04B 41/52* (2006.01)

(52) U.S. Cl.
CPC ............... *C04B 41/0072* (2013.01); *C03B 5/43* (2013.01); *C04B 41/009* (2013.01); *C04B 41/4523* (2013.01); *C04B 41/52* (2013.01)

(58) Field of Classification Search
CPC .... C03B 5/43; C04B 41/009; C04B 41/4523; C04B 41/52
USPC ........... 65/21.4, 22, 20, 141, 335; 264/41, 48; 266/275; 427/334, 384, 385.5; 428/320.2, 322.7, 304, 4, 312.2, 312.8
See application file for complete search history.

(56) References Cited

U.S. PATENT DOCUMENTS 3,547,832 A * 12/1970 Hass et al. .................... 502/439
3,670,061 A   6/1972 Nakayana et al.
5,202,150 A * 4/1993 Benson et al. ................ 427/595

(Continued)

FOREIGN PATENT DOCUMENTS

AT   247535    6/1966
DE   2311306   10/1974

(Continued)

OTHER PUBLICATIONS

English translation of Preliminary Notice of Rejection for Japanese Patent Application No. 2010-529343, dated Oct. 1, 2013.

(Continued)

*Primary Examiner* — Richard Crispino
*Assistant Examiner* — Yana B Krinker
(74) *Attorney, Agent, or Firm* — Bachman & LaPointe, P.C.

(57) ABSTRACT

A method for producing a porous fireproof material suitable for glass production, comprising introducing one or more reducing substances for adjusting an oxygen sink in the pore volume of the fireproof material.

18 Claims, 1 Drawing Sheet

(56) References Cited

U.S. PATENT DOCUMENTS

| | | | |
|---|---|---|---|
| 2002/0066982 A1* | 6/2002 | Yamaguchi et al. | 264/631 |
| 2003/0104196 A1 | 6/2003 | Kobayashi et al. | |
| 2009/0160108 A1* | 6/2009 | Niveau et al. | 266/275 |

FOREIGN PATENT DOCUMENTS

| | | |
|---|---|---|
| DE | 19936292 | 2/2001 |
| EP | 0911298 | 4/1999 |
| GB | 211530 | 2/1924 |
| GB | 1035415 | 7/1966 |
| JP | 02-172880 A | 7/1990 |
| JP | 02-199085 A | 8/1990 |
| JP | 02-199086 A | 8/1990 |
| JP | 02-217384 A | 8/1990 |
| JP | 2004-091307 A | 3/2004 |
| JP | 2004-284859 A | 10/2004 |
| JP | 2006-273675 A | 10/2006 |
| LU | 42440 A1 | 3/1964 |
| WO | 9923050 | 5/1999 |
| WO | 2007131749 | 11/2007 |
| WO | WO 2007131749 A1 * | 11/2007 |

OTHER PUBLICATIONS

Korean Office Action for KR 10-2010-7010672, dated Jul. 31, 2014.

* cited by examiner

POROUS FIREPROOF MATERIAL SUITABLE FOR GLASS PRODUCTION, METHOD FOR THE PRODUCTION THEREOF, AND USES

TECHNICAL FIELD

The present invention concerns a method for the production of a porous refractory material suitable for glass production, a porous refractory material which can be produced by a process according to the invention and use thereof in glass production or for reducing production disadvantages in glass production and use of one or more substances having a reducing action for adjusting an oxygen sink in the pore volume of refractory material suitable for glass production, as set forth in the independent claims.

BACKGROUND OF THE INVENTION

In relation to porous refractory materials (melting assemblies) suitable for glass production, various problems usually arise upon contact with a molten glass. On the one hand the corrosion rate of the surface of the refractory material is directly proportional to the area of contact with the molten glass so that penetration of the molten glass into the generally open porosity of the refractory material results in an increase in corrosion. Besides that reduction in the service life of the melting assembly in addition refractory material can involve dissolution or partial dissolution on the surface in relation to the pore volume, which is then mixed with the molten glass which penetrates into the pores and can thus result in production disturbances, for example inhomogeneities or cords in glass production, as an unwanted accompanying phenomenon. In addition, when the molten glass penetrates into the pore volume of the refractory material, the gaseous phase therein can be at least partially absorbed into the molten glass, which for example can lead to the inclusion of bubbles and thus further production disturbances in glass production (Glastechnische Fabrikationsfehler, Jebsen-Marwedel, R Buckner: Springer-Verlag 1980, page 263).

In order now to improve the corrosion resistance of refractory materials in glass production the surface of the refractory material can be refined and improved by the construction of resistant layers (US No 2003/0104196 and EP 0 911 298) or by coating with platinum metals (GB 211 530 and WO 99/23050). A disadvantage in that respect is on the one hand the high level of complication and expenditure for surface refining and on the other hand the reduced corrosion resistance as soon as the respective layer is worn out.

U.S. Pat. No. 3,670,061 describes a method of improving the corrosion resistance of refractory materials, wherein the refractory material is melted and dry gas is specifically and targetedly introduced into that molten material to produce reduced porosity and concomitantly therewith improved corrosion resistance of the refractory material.

DE 23 11 306 describes a method of increasing the durability of a refractory brickwork of metallurgical vessels by the incorporation of carbon during ongoing operation, wherein a fluid carbon carrier is infiltrated into the brickwork in situ from the undestroyed side of the brickwork.

DE 199 36 292 describes a refractory shaped body for metallurgical processes, a corresponding compound and the production process for same, wherein the refractory material has a high level of resistance in relation to slags of the most widely varying compositions, in particular with different or changing pH values with at the same time handling without any problems and disposal without any problems. That refractory material as the main component comprises a mineral oxidic material which is chemically composed of between 80 and 99% of $Al_2O_3$ and between 1 and 20% of CaO, wherein the mineral oxidic material of the brick which is ready for use has a phase mixture of $\alpha$-$Al_2O_3$, $\beta$-$Al_2O_3$, calcium hexaaluminate ($CA_6$) and calcium dialuminate ($CA_2$) which can be included in proportions respectively between 2 and 50%, preferably respectively between 20 and 30%.

The technical objects on which the present invention is especially based provide for the provision of a porous refractory material suitable for glass production, which has improved corrosion resistance in relation to a molten glass, which permits a reduction in production disadvantages in glass production, which in particular allows a reduction in impurities and contamination in the glass produced, and which is to be produced inexpensively and with simple means.

SUMMARY OF THE INVENTION

Accordingly one or more of the foregoing objects is or are attained by a method for the production of a porous refractory material suitable for glass production, characterised in that the pore volume of the porous refractory material is adjusted as an oxygen sink.

In accordance with the present invention the term 'oxygen sink' signifies that there are introduced into the refractory material one or more substances which, at temperatures which are usually employed for glass production, that is to say usually up to about 1600° C. (glass production temperatures), react with oxygen to afford an oxide, wherein the corresponding oxygen source is usually present (i) as oxygen partial pressure of the pore atmosphere of the refractory material and/or (ii) as available oxygen which is included in the molten glass which penetrates into the pores. The corresponding substances for adjustment of the oxygen sink are usually of an organic or inorganic nature.

The porous refractory material which is produced in accordance with the above-described production process according to the invention and which is suitable for glass production and the use thereof in glass production or for reducing production disadvantages in glass production accordingly also attains one or more of the objects according to the invention.

A further configuration of the present invention concerns the use of one or more substances having a reducing action for adjusting an oxygen sink in the pore volume of refractory material suitable for glass production, characterised in that the substances having a reducing action are suitable at glass production temperatures for reacting with oxygen to afford an oxide.

Preferred configurations are described in the appendant claims and hereinafter. Insofar as appropriate the preferred configurations can be combined together.

DETAILED DESCRIPTION OF THE INVENTION

Figure 1:
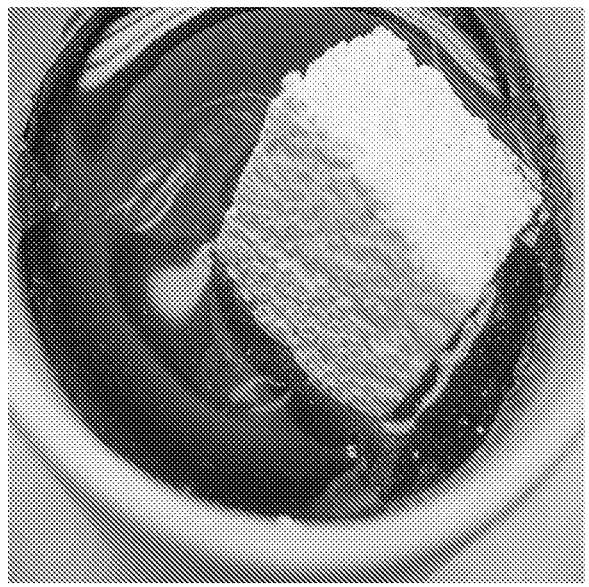
FIG. 1 shows an $Al_2O_3$-rich lightweight brick of high open porosity, which is treated in accordance with the invention with forming gas (5% by volume of HZ) and which was immersed in a molten green glass.

The present invention is based on the realisation that the adjustment according to the invention of an oxygen sink in the pore volume of the porous refractory material suitable for glass production means that in particular the surface tension of the refractory material, in relation to a molten glass having an oxidising action is altered, in such a way that in glass production penetration of the molten glass into the pore volume of the refractory material is at least reduced, in relation to untreated pore surfaces. The reduction in the surface area of penetration and/or depth of penetration of the molten glass into the pore volume of the refractory material makes it possible to reduce on the one hand the corrosion of the porous refractory material and on the other hand mixing of the gaseous phase from the pore volume of the refractory material with the molten glass. In addition it was observed that a porous refractory material produced in accordance with the invention, in glass production, can cause reduced initial or partial dissolution of the surface material of the refractory material so that, in comparison with untreated surfaces, the molten glass is not contaminated or is contaminated to a lesser degree, due to partially dissolved refractory material. Consequently the use of porous refractory material produced according to the invention in glass production leads to fewer production disadvantages.

In accordance with the present invention any porous refractory material which is suitable for glass production can be used for the production process. By way of example suitable materials are described in US No 2003/0104196, EP 0 911 298, GB 211 530, WO 99/23050, U.S. Pat. No. 3,670,061 and the following Examples. Preferably the porous refractory material to be used is selected from the group consisting of lightweight brick of high open porosity, preferably $Al_2O_3$-rich lightweight brick; fire-clay brick, preferably with 54.1% by mass of $SiO_2$, 42.4% by mass of $Al_2O_3$, 1.9% by mass of $Fe_2O_3$ and 1.6% by mass of ($Na_2O$ and $K_2O$) (preferably supplied by Krause & Co KG); zirconium silicate brick, preferably with 32.0% by mass of $SiO_2$ and 65% by mass of $ZrO_2$ (preferably supplied by Krause & Co KG); corundum-zirconium brick, preferably with 13.0% by mass of $SiO_2$, 58.0% by mass of $Al_2O_3$, 28% by mass of $ZrO_4$ and 0.1% by mass of $Fe_2O_3$ (preferably supplied by Krause & Co KG).

Adjustment according to the invention of the oxygen sink in the pore volume of the refractory material can be implemented in a preferred configuration on the one hand by filling the porous refractory material with one or more substances having a reducing action, which are introduced at appropriately suitable temperatures possibly with the application of reduced pressure into the porous refractory material. Those substances with a reducing action are suitable at gas production temperatures, preferably at temperatures of more than 200° C., further preferably between 700° C. and 1600° C., quite particularly preferably between 1000° C. and 1500° C., for reacting with oxygen to afford an oxide.

In accordance with the present invention the expression 'filling the porous refractory material with one or more substances having a reducing action' or the expression 'introducing one or more substances having a reducing action into the pore volume of the refractory material' signifies that the substance or substances having a reducing action replaces a part or the entire pore volume of the refractory material to be used according to the invention. In that case in accordance with the invention the surface tension of the pore surface of the refractory material is so altered that the molten glass does not penetrate, or penetrates to an extent which is less in comparison with the untreated surface, into the pores or into some of the pores of the refractory material. Usually the substances having a reducing action are introduced into the pore volume of the refractory material over a suitable period, preferably between 1 and 10 hours, further preferably between 2 and 5 hours, at a suitable temperature. In a further preferred configuration for that purpose the temperature can be increased, preferably to more than 200° C., further preferably to between 500° C. and 1200° C. and quite particularly preferably to between 700° C. and 1000° C.

Preferably it is possible to use organic substances which have a reducing action, further preferably from the group consisting of oils, alcohols, metal alcoholates and/or waxes.

In addition to the changes in surface tension of the pores of the refractory material, metal alcoholates can also have a suitable reduction potential in relation to the molten glass which penetrates into the pore volume and which also reduces penetration of the molten glass into the or a part of the pore volume.

By way of example an aluminum alcoholate can be used as the metal alcoholate. Preferably for that purpose $AlCl_3$ is dissolved in methanol or ethanol, wherein the ratio by weight of $AlCl_3$ is preferably 10% by weight or more with respect to the total weight of the solution. The resulting aluminum alcoholate can already be introduced at ambient temperature into the open porosity of the refractory material. A contacting time of less than 1 hour may be sufficient for introducing the metal alcoholate, preferably aluminum alcoholate. When the refractory material which is treated according to the invention in that fashion is slowly heated, the desired properties can already occur in the context of the glass production heating phase, and those reductions result in particular in the desired changes in surface tension and/or the desired reduction potentials in relation to the molten glass which penetrates into the pore volume.

Alternatively or cumulatively a further possible way of adjusting the oxygen sink involves effecting filling with gases or gas mixtures which have a reducing action (gaseous at ambient temperature), which include for example $H_2$ and/or $CO_2$, preferably $H_2$, further preferably with 5% by volume of $H_2$ (forming gas). The gas or gas mixture is usually urged or sucked into the pore volume of the refractory material to produce a suitable gas atmosphere, preferably a forming gas atmosphere. To adjust the appropriate (forming) gas atmosphere the gas or gas mixture is usually introduced into the pore volume of the refractory material over a suitable period, preferably between 1 and 10 hours, further preferably between 2 and 5 hours, at a suitable temperature. In a further preferred configuration for that purpose the temperature can be increased, preferably to more than 200° C., further preferably to between 500° C. and 1200° C., and quite particularly preferably to between 700° C. and 1000° C. To conserve that gas atmosphere the pores of the refractory material can be closed with a suitable closure material, preferably wax or wax mixture (having a reducing action). At the temperatures of use of the refractory material wax, as the closure material, additionally itself has a reducing action.

In ongoing operation the substances having a reducing action which are gaseous or non-gaseous at ambient temperature (fluid or solid) can be further introduced from the exterior into the pores of the refractory material by suitable measures in order to maintain the effect, that is to say the change in surface tension of the refractory material, over a prolonged period of time. The use of externally applied pressure chambers using flue gas would further have the advantage that, in parallel besides that further introduction function, it would also be possible to reduce heat losses. In that way the penetration of molten glasses into the porous refractory material can be (at least partially) prevented even in continuous operation, and that can result in a considerable reduction in corrosion and the production-engineering disadvantages linked thereto.

In a further alternative or cumulative preferred configuration of the production process according to the invention the pore volume of the porous refractory material can also be adjusted as an oxygen sink by it being provided with one or more inorganic substances which have a reducing action and which react with oxygen to afford an oxide at glass production temperatures, preferably at temperatures of more than 200° C., further preferably between 700° C. and 1600° C., quite particularly preferably between 1000° C. and 1500° C. Suitable inorganic substances can be selected from metals or metal alloys with a melting point of less than or equal to 1000° C. (low-melting metals or metal alloys), preferably less than or equal to 700° C. In a preferred configuration those metal or metal alloys have a reduction potential in relation to the molten glass which penetrates into the pore volume. In a particularly preferred configuration in relation thereto fusible aluminum (at temperatures above or equal to the melting point of the aluminum) or tin (at temperatures above or equal to the melting point of the tin) is introduced into the pore volume of the refractory material to adjust the oxygen sink.

In accordance with the present invention the expression 'filling the porous refractory material with inorganic substances having a reducing action' or 'introducing inorganic substances having a reducing action into the pore volume of the refractory material' signifies that inorganic substances having a reducing action, preferably low-melting metals or metal alloys, particularly preferably fusible aluminum or tin, replaces a part of or the entire pore volume of the refractory material to be used according to the invention. In that case on the one hand the surface tension of the pore surface of the refractory material is so altered that the molten glass does not penetrate or penetrates to a lesser degree in comparison with the untreated surface, into the pores or some of the pores of the refractory material. In addition to the aforementioned effect of altering the surface tension of the pore surface of the refractory material, when the pore volume of the refractory material to be used according to the invention is filled with inorganic substances having a reducing action, preferably low-melting metals or metal alloys, particularly preferably fusible aluminum or tin, the advantageous effect occurs that, at the contact front in relation to the oxidising molten glass, the inorganic substances having a reducing action are oxidised to afford the respective oxide, preferably aluminum to give $Al_2O_3$ or tin to give $SnO$, and $SiO_2$ out of the molten glass is reduced to $Si$, thereby producing an additional solid-state barrier layer which further prevents the penetration of the molten glass into the or a part of the pore volume.

Metals or metal alloys having a reducing action are usually heated under reducing conditions and introduced into the fusible state into the or part of the pore volume of the refractory material. The corresponding reactions with the residual oxygen take place in the pore volume, whereby firstly a reduced pressure is generated and penetration of the molten glass can be made possible. At the contact limit in relation to the molten glass, the further reactions can then occur, as described hereinbefore, which can lead to an additional solid-state barrier layer.

Further configurations according to the invention are set forth hereinafter:

a) a method of increasing the corrosion resistance of refractory materials, characterised in that the pore volume of the refractory material is adjusted as an oxygen sink.

b) A method in accordance with configuration a) characterised in that substances having a reducing action are introduced into the pore volume of the refractory material.

c) A method in accordance with configuration a) and b) characterised in that organic substances are introduced into the pore volume of the refractory material.

d) A method in accordance with configuration a) through c) characterised in that oil, alcohol and/or wax are introduced into the pore volume of the refractory material.

e) A method in accordance with configuration a) and b) characterised in that gases having a reducing action are introduced into the pore volume of the refractory material and the refractory material is thereafter optionally covered with wax.

f) A method in accordance with configuration a), b) and e) characterised in that $H_2$ and/or $CO_2$ are introduced into the pore volume.

g) A method in accordance with configuration a) and b) characterised in that the gaseous or liquid substance having a reducing action is further supplied to the refractory material in use from the exterior by suitable measures.

h) A method in accordance with configuration a) and b) characterised in that fusible aluminum is introduced into the pore volume of the refractory material at temperatures above the aluminum melting point.

Embodiments by Way of Example

The present invention is described hereinafter by means of embodiments by way of example which however do not limit the scope of the subjects claimed in accordance with the invention as set forth in independent claims.

Example 1

Figure 2:
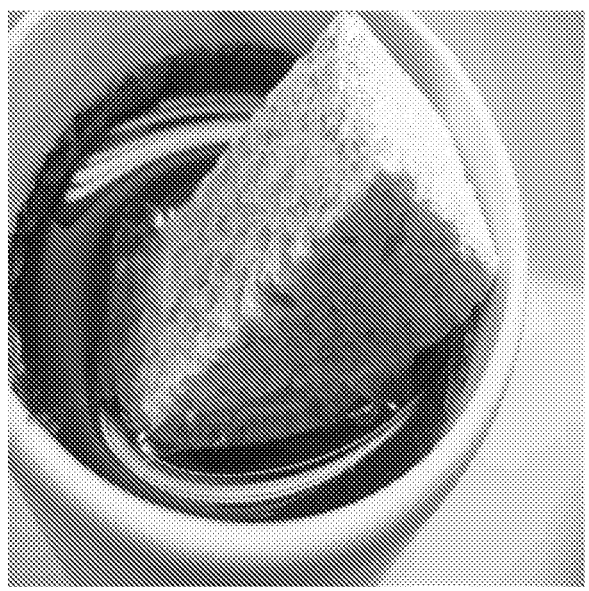
FIG. 2 shows an $Al_2O_3$-rich lightweight brick of high open porosity, which is not treated in accordance with the invention and which was immersed in a molten green glass.

An $Al_2O_3$-rich lightweight brick with high open porosity is filled with forming gas (5% by volume of $H_2$) as a reducing substance (it is acted upon therewith). To conserve the forming gas the lightweight brick is closed with wax. The brick which is pretreated in accordance with the invention in that way is immersed for a period of 10 minutes in a molten glass comprising green container glass at a temperature of 1300° C. and thereafter the molten glass with the brick is subjected to natural oven cooling. An untreated brick is subjected to the same test conditions, as a comparative sample. As the outcome, the pretreated brick (FIG. 1) is unwetted at the three-zone limit (boundary angle>90°. The comparative sample (FIG. 2) is wetted at the three-zone limit and sucked full with molten glass due to capillary action.

Example 2

Cylinders of a diameter of 18 mm and a length of 125 mm were bored by means of a hollow drill borer out of a fire-clay brick from Krause & Co KG with the manufacturer details of the composition in accordance with the data sheet of 54.1% by mass of $SiO_2$, 42.4% by mass of $Al_2O_3$, 1.9% by mass of $Fe_2O_3$ and 1.6% by mass of ($Na_2O$ and $K_2O$). The cylindrical sample bodies were wrapped in a layer of aluminum foil (about 1 g to the about 71 cm$^2$ sample area) and heated for 3 hours at 710° C. in a forming gas atmosphere. After that treatment according to the invention any residues were removed from the surfaces of the sample bodies and the sample investigated for resistance by means of a static finger test. For the finger test 100 g of colorless glass of a composition comprising 73.12% by mass of $SiO_2$, 1.23% by mass of $Al_2O_3$, 12.75% by mass of $Na_2O$, 2.47% by mass of $MgO$, 9.76% by mass of $CaO$, 0.06% by mass of $Fe_2O_3$, 0.04% by mass of $TiO_2$ and 0.21% by mass of $SO_3$ was melted at a temperature of 1360° C. After a holding time of 4 hours at that temperature the cylindrical sample bodies were placed in the molten material (immersion depth of 55 mm) and kept at a temperature of 1360° C. for 20 hours in an oxidising atmosphere. Thereafter the sample bodies were removed from the molten material and cooled down in controlled fashion.

As comparative samples in that respect untreated cylindrical sample bodies were subjected to the static finger test for colorless glass, as described hereinbefore.

It was found that the treatment according to the invention of the porous refractory material afforded a reduction in the corrosion area. Corrosion resistance was increased by about 20%.

Example 3

Cylinders of a diameter of 18 mm and a length of 125 mm were bored by means of a hollow drill borer out of a zirconium silicate brick from Krause & Co KG with the manufacturer details of the composition in accordance with the data sheet of 32.0% by mass of $SiO_2$, and 65% by mass of $ZrO_2$. The cylindrical sample bodies were wrapped in a layer of aluminum foil (about 1 g to the about 71 cm² sample area) and heated for 3 hours at 710° C. in a forming gas atmosphere. After that treatment according to the invention any residues were removed from the surfaces of the sample bodies and the sample investigated for resistance by means of a static finger test. For the finger test 100 g of brown glass of a composition comprising 71.46% by mass of $SiO_2$, 2.11% by mass of $Al_2O_3$, 12.30% by mass of $Na_2O$, 1.06% by mass of MgO, 10.39% by mass of CaO, 0.41% by mass of $Fe_2O_3$, 0.07% by mass of $TiO_2$ and 0.04% by mass of $SO_3$ was melted at a temperature of 1360° C. After a holding time of 4 hours at that temperature the cylindrical sample bodies were placed in the molten material (immersion depth of 55 mm) and kept at a temperature of 1360° C. for 20 hours in an oxidising atmosphere. Thereafter the sample bodies were removed from the molten material and cooled down in controlled fashion.

As comparative samples in that respect untreated cylindrical sample bodies were subjected to the static finger test for brown glass, as described hereinbefore.

It was found that the treatment according to the invention of the porous refractory material afforded a reduction in the corrosion area. Corrosion resistance was increased by about 12%.

Example 4

Cylinders of a diameter of 18 mm and a length of 125 mm were bored by means of a hollow drill borer out of a corundum-zirconium brick from Krause & Co KG with the manufacturer details of the composition in accordance with the data sheet of 13.0% by mass of $SiO_2$, 58.0% by mass of $Al_2O_3$, 28% by mass of $ZrO_2$ and 0.1% by mass of $Fe_2O_3$. The cylindrical sample bodies were wrapped in a layer of aluminum foil (about 1 g to the about 71 cm² sample area) and heated for 3 hours at 910° C. in a forming gas atmosphere. After that treatment according to the invention any residues were removed from the surfaces of the sample bodies and the sample investigated for resistance by means of a dynamic finger test. In that case the samples were gripped in a corundum holder and heated with the glass from Example 2. In that case the furnace was heated to 1475° C. at 7.44 K/min. After a holding time of 15 minutes the sample was let into the molten material. A speed of rotation of 65 rpm was then effected by means of a motor. Dynamic corrosion attack in a reduced atmosphere (about 65 l of $N_2$/h) was now effected for 24 hours. The reduced atmosphere was adjusted so that the treated samples did not oxidise up during the heating operation. After 24 hours the sample was put to the initial state by means of holding. The sample now dropped off for 15 minutes over the molten material before the furnace automatically regulated the temperature down and thus cooled the sample down in a controlled fashion.

As comparative samples in that respect untreated cylindrical sample bodies were subjected to the dynamic finger test for colorless glass, as described hereinbefore.

The corrosion regions at the glass level line were photographed on the sample bodies to characterise the greatest reduction. It was found in that respect that, by virtue of the treatment according to the invention for the sample bodies at 910° C., corrosion resistance could be increased by 12%.

The invention claimed is:

1. A glass melting system, the melting system comprising:
a porous refractory material adapted for glass production wherein a pore volume of the refractory material is in contact with a molten glass, wherein treated regions of the refractory material have one or more substances which have a reducing action and which at glass production temperatures of between 200° C. and 1600° C. react with oxygen of the pore volume in these treated regions to produce an oxide which replaces up to the entire pore volume with oxide during glass production,
wherein the surface tension of the pore surface of these treated regions of the refractory material is such that during glass production the molten glass does not penetrate or penetrates to a lesser degree into the pore volume of the treated regions of the refractory material with said one or more substances when compared to the untreated regions of the refractory material, and
wherein said one or more substances which have a reducing action comprise metal alcoholates.

2. A melting apparatus as set forth in claim 1, wherein the substance or substances having a reducing action is or are inorganic and/or organic substances.

3. A melting apparatus as set forth in claim 2, wherein the substance or substances having a reducing action includes an organic substance selected from the group consisting of oil, alcohol, metal alcoholates, wax and mixtures thereof.

4. A melting apparatus as set forth in claim 2, wherein the substance or substances having a reducing action represents or represent a gas or gas mixture at ambient temperature.

5. A melting apparatus as set forth in claim 4, wherein the gas or gas mixture includes or consists of $H_2$ and/or $CO_2$.

6. A melting apparatus as set forth in claim 5, wherein, after introduction of the gas or gas mixture which has a reducing action into the pore volume of the refractory material at least a part of the pores of the refractory material is additionally entirely or partially closed by means of one or more suitable closure materials.

7. A melting apparatus as set forth in claim 6, wherein the one or more suitable closure materials include wax having a reducing action.

8. A melting apparatus as set forth in claim 4, wherein, after introduction of the gas or gas mixture which has a reducing action into the pore volume of the refractory material at least a part of the pores of the refractory material is additionally entirely or partially closed by means of one or more suitable closure materials.

9. A melting apparatus as set forth in claim 8, wherein the one or more suitable closure materials include wax having a reducing action.

10. A melting apparatus as set forth in claim 1, wherein one or more metals or metal alloys having a melting point of less than or equal to 1000° C. is or are introduced as the substance or substances having a reducing action.

11. A melting apparatus as set forth in claim 10, wherein the metal is aluminum and/or tin.

12. A melting apparatus as set forth in claim 1, wherein the metal alcoholates comprise aluminum alcoholate.

13. A melting apparatus as set forth in claim 12, wherein the aluminum alcoholate is $AlCl_3$, dissolved in methanol or ethanol, wherein the ratio of $AlCl_3$ is 10% by weight or more with respect to the total weight of the solution.

14. A melting apparatus as set forth in claim 1, wherein reaction of said substances with the oxygen of the pore volume is at glass production temperatures of between 700° C. and 1600° C.

15. A melting apparatus as set forth in claim 1, wherein:
the porous refractory material comprises $Al_2O_3$-rich brick.

16. A melting apparatus as set forth in claim 1, wherein:
the porous refractory material comprises fire-clay brick.

17. A melting apparatus as set forth in claim 1, wherein:
the porous refractory material comprises zirconium silicate brick.

18. A melting apparatus as set forth in claim 1, wherein:
the porous refractory material comprises corundum-zirconium brick.

* * * * *